US006976086B2

(12) United States Patent
Sadeghi et al.

(10) Patent No.: US 6,976,086 B2
(45) Date of Patent: Dec. 13, 2005

(54) SYSTEMS AND METHODS TO FACILITATE A DISTRIBUTION OF INFORMATION VIA A DYNAMICALLY LOADABLE COMPONENT

(75) Inventors: Amir Sadeghi, San Jose, CA (US); Uwe Steinmueller, San Jose, CA (US); Gerald Schwartz, Santa Clara, CA (US); Manfred Rakowski, Vienna (AT)

(73) Assignee: Siemens Business Services, LLC, San Jose, CA (US)

( * ) Notice: Subject to any disclaimer, the term of this patent is extended or adjusted under 35 U.S.C. 154(b) by 826 days.

(21) Appl. No.: 09/908,010

(22) Filed: Jul. 18, 2001

(65) Prior Publication Data

US 2002/0194305 A1    Dec. 19, 2002

Related U.S. Application Data

(60) Provisional application No. 60/299,208, filed on Jun. 18, 2001.

(51) Int. Cl.$^7$ ............................................. G06F 13/00
(52) U.S. Cl. ...................................... 709/236; 709/232
(58) Field of Search .............................. 709/230–232, 709/236

(56) References Cited

U.S. PATENT DOCUMENTS

| 5,844,808 A | 12/1998 | Konsmo et al. |
| 5,936,547 A | 8/1999 | Lund |
| 5,953,506 A * | 9/1999 | Kalra et al. ................. 709/231 |
| 6,594,699 B1 * | 7/2003 | Sahai et al. ................. 709/228 |
| 6,725,446 B1 * | 4/2004 | Hahn et al. ................. 717/103 |
| 6,801,936 B1 * | 10/2004 | Diwan ........................ 709/219 |
| 2002/0024536 A1 * | 2/2002 | Kahan et al. ............... 345/745 |
| 2002/0032788 A1 * | 3/2002 | Emanuel et al. ............ 709/230 |

OTHER PUBLICATIONS

Wei-Ying Ma, Ija Bedner, Grace Chang, Allan Kuchinsky, and Hongjiang Zhang, "A Framework for Adaptive Content Delivery in Heterogeneous Network Environments," cooltown.hp.com/dev/wpapers (2000).
"About TrackEngine," www.nexlabs.com (2001).
"Yahoo! Finance—Stock Alerts," alerts.yahoo.com (2001).
"Yahoo! News—Alerts," alerts.yahoo.com (2001).

* cited by examiner

Primary Examiner—Kenneth R. Coulter (57) ABSTRACT

Systems and methods are provided to facilitate a distribution of information via one or more dynamically loadable components. According to one embodiment, one or more items of information are collected (e.g., from one or more information sources). The collected information is then evaluated via a dynamically loadable aggregation rule associated with a user. Based on this evaluation, it may be arranged for the user to receive notification information. According to some embodiments, it is also arranged for the user receive priority information (e.g., via a wireless device).

32 Claims, 10 Drawing Sheets

INFORMATION DISTRIBUTION SYSTEM

SUBSCRIPTION INTERFACE

SELECT INFORMATION CHANNEL AND RULE:

- STOCK MONITOR
    MULTIPLE STOCK DEVIATION
    STOCK TREND
- COMPANY NEWSLETTER
- CURRENT QUARTER SALES
- ORDER STATUS EXCEPTION
- PRODUCT LINE EXCEPTION

512

520

INFORMATION DISTRIBUTION SYSTEM

SUBSCRIPTION INTERFACE - RULE PROPERTIES

INFORMATION CHANNEL: STOCK MONITOR

INFORMATION RULE: MULTIPLE STOCK DEVIATION

NAME OF INSTANCE: MY INFINEON/SIEMENS MONITOR

FIRST STOCK SYMBOL: IFX    SECOND STOCK SYMBOL: SI
FIRST BASE VALUE: 38.50    SECOND BASE VALUE: 52.50

DEVIATION (AVERAGE): 5%

PRIORITY NOTIFICATION: YES, VIA WIRELESS PDA

| USER IDENTIFIER 802 | AGGREGATION RULE IDENTIFIER 804 | AGGREGATION RULE INFORMATION 806 | PRIORITY NOTIFICATION INFORMATION 808 |
|---|---|---|---|
| U1001 | MULTIPLE STOCK DEVIATION | IFX BASE = 38.50; SI BASE = 52.50; 5% DEVIATION | WIRELESS PDA |
| U1001 | MULTIPLE STOCK DEVIATION | IFX BASE = 38.50; SI BASE = 52.50; 2.5% DEVIATION | NONE |
| U1002 | COMPANY NEWSLETTER | NEW PRODUCT UPDATE | WIRELESS TELEPHONE |
| U1003 | INVENTORY MONITOR | SYRUP LEVEL < 10% AND TEMPERATURE < 80 DEG | NONE |
| U1003 | INVENTORY MONITOR | SYRUP LEVEL < 10% AND TEMPERATURE ≥ 80 DEG | FACSIMILE |

FIG. 8

| INFORMATION IDENTIFIER 902 | USER IDENTIFIER 904 | FIRST ITEM OF INFORMATION 906 | SECOND ITEM OF INFORMATION 908 | NOTIFICATION RESULT 910 |
|---|---|---|---|---|
| I1001 | U1001 | IFX = 47.00 | SI = 50.00 | WIRELESS PDA |
| I1002 | U1001 | IFX = 37.50 | SI = 56.00 | PUBLISH |
| I1003 | U1003 | SYRUP LEVEL = 15% | TEMPERATURE = 90 DEG | NONE |
| I1004 | U1003 | SYRUP LEVEL = 8.5% | TEMPERATURE = 75 DEG | PUBLISH |
| I1005 | U1003 | SYRUP LEVEL = 8.5% | TEMPERATURE = 85 DEG | FACSIMILE |

SYSTEMS AND METHODS TO FACILITATE A DISTRIBUTION OF INFORMATION VIA A DYNAMICALLY LOADABLE COMPONENT

CROSS REFERENCE TO RELATED APPLICATIONS

The present application claims the benefit of U.S. Provisional Patent Application Ser. No. 60/299,208, entitled "SCAN (Subscription, Aggregation, Collection, Notification) Pattern Using Aggrilets" filed on Jun. 18, 2001. The entire contents of this provisional application are incorporated herein by reference.

BACKGROUND OF THE INVENTION

1. Field of the Invention

The present invention relates to information systems. In particular, the present invention relates to systems and methods to facilitate a distribution of information via one or more dynamically loadable components.

2. Description of the Related Art

People, such as business people, increasingly need to aware of important information (e.g., time-sensitive information). For example, a business person may need to be aware of financial information or product information as it becomes available via a communication network. Traditionally, a person would become aware of such information by asking for the information (e.g., by performing a search via an Internet portal). This approach, however, has several disadvantages. For example, it may be time-consuming to perform a search—especially if the person needs the information on a regular basis. Moreover, the person will only receive information after he or she initiates a search. As a result, the person may not receive important information in a timely fashion (e.g., when he or she does not perform a search for an extended period of time).

It is known that a person can have an information service monitor a particular item of information. The information service will then automatically notify the person when the item of information satisfies a pre-determined condition. For example, the YAHOO!® Finance stock alert service lets a person define (i) a particular stock symbol, (ii) a pre-determined threshold value associated with the stock, and (iii) an electronic mail address. The stock alert service will then monitor the stock's current value and automatically transmits an electronic mail message when the value falls below (or rises above) the pre-determine threshold value.

Even this approach, however, has a number of disadvantages. For example, existing services are inflexible because they use a hard-coded rule to monitor a single, discrete item of information (e.g., a stock's current value) in a pre-defined way to determine when a message will be transmitted (although a person may separately and independently arrange to have a number of different stock values monitored). This limitation significantly restricts the usefulness of these services for many people. For example, one person may only want to know when both of the following conditions are satisfied: (i) the stock's current value falls below a particular price and (ii) the trading volume of the stock rises above a particular amount. Another person may instead need to known when a first stock's current value rises above a second stock's current value. Existing services cannot efficiently interpret multiple items of information in the various ways that may be needed different people.

Another disadvantage is that known services use hard-coded rules to monitor information from a single information source (e.g., a stock quote service). Some people, however, may be interested in knowing when information from a number of different information sources meets certain conditions. Consider, for example, a business person who is responsible for maintaining sufficient syrup levels in a large number of carbonated beverage machines. This person will, of course, be interested in knowing the current syrup levels in those machines. The person may also be interested in the likely rate at which syrup will be consumed as indicated by the current (or predicted) temperature (e.g., a ten percent level of syrup may be sufficient when the temperature is fifty degrees but not when the temperature is ninety degrees). Note that some information of interest to a person may reside within an enterprise boundary (e.g., current syrup levels) while some resides outside the enterprise boundary (e.g., a weather forecast source). Existing services cannot efficiently interpret information from multiple information sources.

Another disadvantage is that existing services use hard-coded rules to transmit information via a single device of delivery method (e.g., to a person's electronic mail account). Many people, however, cannot receive all information of interest via a single device. For example, a salesperson may need to receive information about less important customers via a desktop Personal Computer (PC) and information about more important customers via a wireless Personal Digital Assistant (PDA). Because known services do not have this ability, a person may receive an overwhelming amount of information via a single device (e.g., information about all customers may be received via his or her PDA).

SUMMARY OF THE INVENTION

To alleviate problems inherent in the prior art, the present invention introduces systems and methods to facilitate a distribution of information via one or more dynamically loadable components.

According to one embodiment, an item of information is collected. The item of information is evaluated via a dynamically loadable aggregation rule associated with a user, and it is arranged for the user to receive notification information based on this evaluation.

According to another embodiment, subscription information defining an aggregation rule is received from a user. A first item of information is collected from a first information source, and a second item of information is collected from a second information source. The first and second items of information are then dynamically evaluated via the aggregation rule. Based on the evaluation, publication information is transmitted to a first user device and priority information is transmitted in substantially real time to a second user device.

According to still another embodiment, first and second items of information are received. The first and second items of information are evaluated via an aggregation rule associated with a user, and it is arranged for the user to receive notification information based on the evaluation.

According to yet another embodiment, subscription information is received from a user, the subscription information indicating a first user device, a second user device, and defining an aggregation rule. An item of information is evaluated via the aggregation rule after being collected from an information source. It is then arranged for the user to receive notification information via at least one of the users device based on the evaluation.

Other embodiments are directed to methods performed by a user. According to some of these embodiments, subscription information is provided to an information controller, the subscription information defining an aggregation rule associated with a first item of information and a second item of information. Based on the aggregation rule, notification information is then received via a user device. According to another embodiment, subscription information is provided to an information controller, the subscription information defining an aggregation rule that indicates publication information to be received via a first user device and priority information to be received via a second user device. Based on the aggregation rule, information is then received via at least one of the user devices.

One embodiment of the present invention comprises: means for collecting an item of information; means for evaluating the item of information via a dynamically loadable aggregation rule associated with a user; and means for arranging for the user to receive notification information based on said evaluation.

Another embodiment comprises: means for receiving subscription information from a user, the subscription information defining an aggregation rule; means for collecting a first item of information from a first information source; means for collecting a second item of information from a second information source; means for dynamically evaluating the first item of information and the second item of information based on the aggregation rule; means for transmitting publication information to a first user device based on said evaluation; and means for transmitting priority information in substantially real time to a second user device based on said evaluation.

Another embodiment comprises: means for receiving a first item of information; means for receiving a second item of information; means for evaluating the first item of information and the second item of information based on an aggregation rule associated with a user; and means for arranging for the user to receive notification information based on said evaluation.

Another embodiment comprises: means for receiving subscription information from a user, the subscription information indicating a first user device, a second user device, and defining an aggregation rule; means for collecting an item of information from an information source; means for evaluating the item of information based on the aggregation rule defined by the user; and means for arranging for the user to receive notification information via at least one of the first user device and the second user device based on said evaluation.

Still another embodiment comprises: means for providing subscription information to an information controller, the subscription information defining an aggregation rule associated with a first item of information and a second item of information; and means for receiving notification information via a user device based on the aggregation rule.

Yet another embodiment comprises: means for providing subscription information to an information controller, the subscription information defining an aggregation rule indicating publication information to be received via a first user device and priority information to be received via a second user device; and means for receiving information via at least one of the first user device and the second user device based on the aggregation rule.

With these and other advantages and features of the invention that will become hereinafter apparent, the invention may be more clearly understood by reference to the following detailed description of the invention, the appended claims, and the attached drawings.

DETAILED DESCRIPTION

The present invention is directed to systems and methods to facilitate a distribution of information via one or more dynamically loadable components. As used herein, "information" refers to any data that can be received from an information source (e.g., an Internet portal or business application) or provided to a user (e.g., via a user device). Some examples of information include financial information (e.g., a stock price), news information (e.g., a political news story), business information (e.g., inventory or production information), travel information (e.g., flight or traffic information), and weather information (e.g., a current temperature). Moreover, a "dynamically loadable component" may be any component capable of being executed via an application or engine as described herein.

Information System Overview

Figure 1:
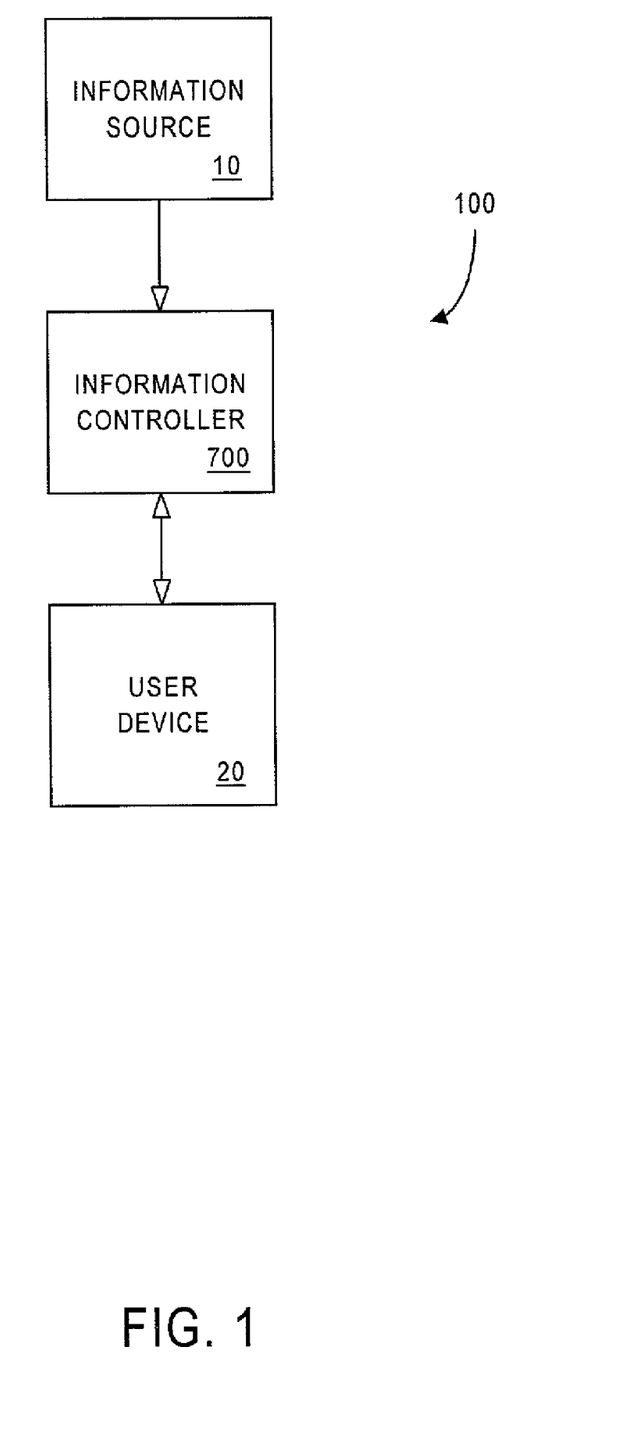
FIG. 1 is a block diagram overview of an information system according to one embodiment of the present invention.

Turning now in detail to the drawings, FIG. 1 is a block diagram overview of an information system 100 according to one embodiment of the present invention. As shown in FIG. 1, a user device 20 may transmit information to an information controller 700. For example, the user device 20 may indicate to the information controller 700 a type of information that is of interest to a user (e.g., indicating that the user is interested in product inventory levels). According to one embodiment, the user device 20 also defines one or more rules (e.g., the user may want to know when a particular product inventory level falls below a particular threshold). The user device 20 may also indicate one or more ways in which the user wants to receive information (e.g., via a PC or a wireless telephone).

The information controller 700 also receives information from an information source 10. For example, the information controller may communicate with an information source 10 to collect the information that is of interest to the user.

Based on the information received from the information source 10, the information controller 700 transmits information to the user device 20. For example, the information controller 700 may evaluate information received from the information source 10 (e.g., in accordance with a rule defined by the user) and determine whether or not the information will be forward to the user device 20.

Figure 2:
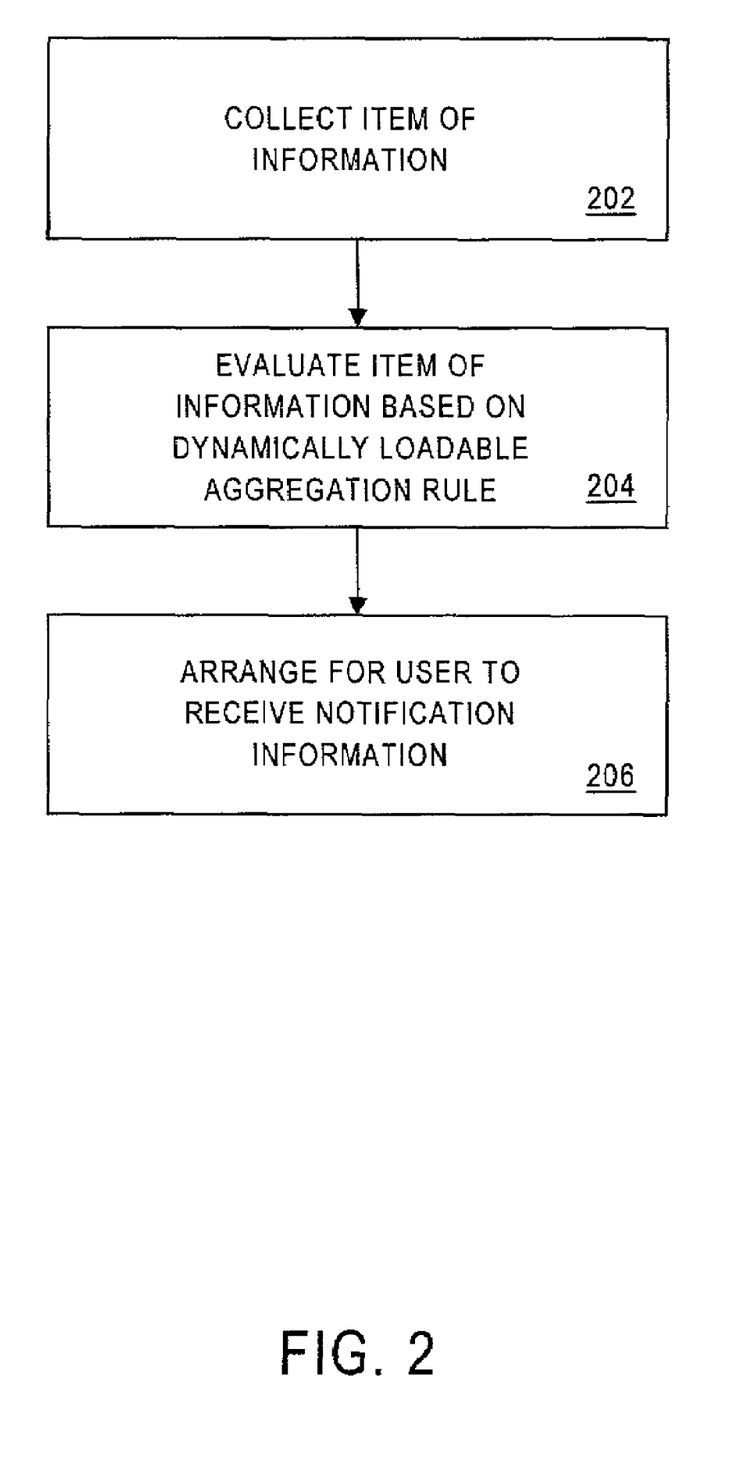
FIG. 2 is a flow chart of a method for facilitating a distribution of information according to one embodiment of the present invention.

FIG. 2 is a flow chart of a method for facilitating an exchange of information according to one embodiment of the present invention. The flow charts in FIG. 2 and the other figures described herein do not imply a fixed order to the steps, and embodiments of the present invention can be practiced in any order that is practicable. The method shown in FIG. 2 may be performed, for example, by the information controller 700.

At 202, an item of information is collected. For example, the information controller 700 may collect an item of information that is of interest to a user from an information source 10. According to one embodiment, the item of information is collected based on information received from a user during a subscription process. For example, a user may subscribe to an information service and indicate that he or she is interested in knowing when the average current value of two stocks deviates from a base value by more than a pre-determined amount (e.g., five percent). In this case, the information controller 700 may periodically communicate with a financial information source to determine each stock's current value.

At 204, the item of information is evaluated via a dynamically loadable aggregation rule "associated" with the user. According to one embodiment, the aggregation rule is associated with the user when he or she defines or selects the aggregation rule. For example, the information controller 700 may compute a current average value of two stocks (selected by a user) and determine if the average value has deviated from a base value by more than a pre-determined amount.

At 206, it is arranged for the user to receive notification information based on the evaluation. For example, when the information controller 700 determines that a current average value of two stocks has deviated from a base value by more than a pre-determined amount, an electronic mail message may be immediately transmitted to a user's PDA.

A more detailed description of some embodiments of the present invention will now be provided with respect to FIGS. 3 through 10.

Information System Architecture

Figure 3:
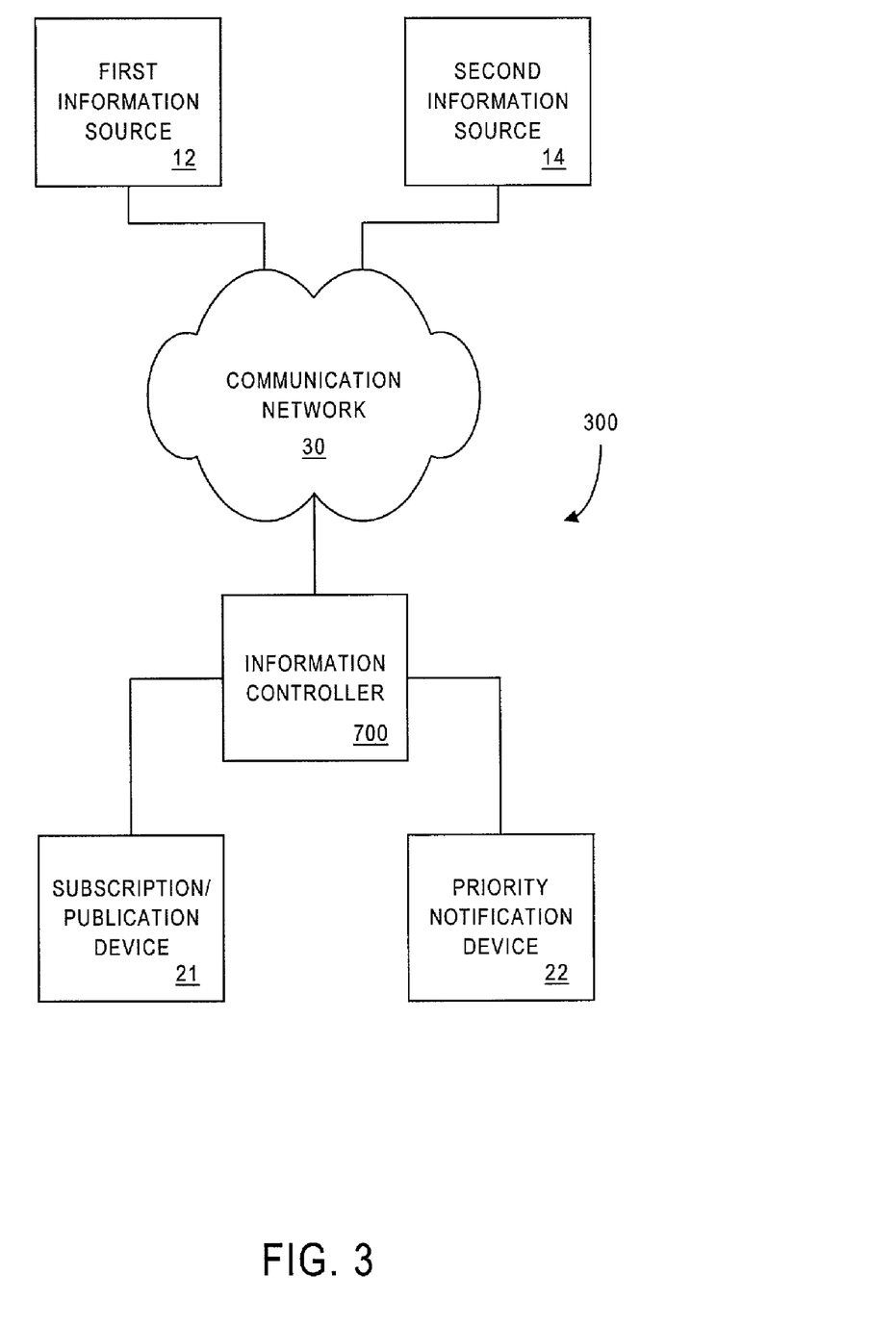
FIG. 3. is a block diagram overview of an information system according to another embodiment of the present invention.

FIG. 3. is a block diagram overview of an information system 300 according to some embodiments of the present invention. The information system 300 includes the information controller 700 in communication with a number of information sources 12, 14. As used herein, devices (such as the information controller 700 and the information sources 12, 14) may communicate, for example, via a communication network 30, such as a Local Area Network (LAN), a Metropolitan Area Network (MAN), a Wide Area Network (WAN), a proprietary network, a Public Switched Telephone Network (PSTN), a Wireless Application Protocol (WAP) network, or an Internet Protocol (IP) network such as the Internet, an intranet, or an extranet. According to one embodiment, a protective firewall (not shown in FIG. 3) is established between the information controller 700 and the communication network 30. Note that, as used herein, communications include those enabled by wired or wireless technology. Moreover, although a single information controller 700 is shown in FIG. 3, any number of information controllers 700 (or any other devices described herein) may be included in the information system 300 according to embodiments of the present invention.

The information controller 700 is also in communication with a number of user devices 21, 22. In particular, the information controller 700 communicates with a subscription/publication device 21 (e.g., a desktop workstation associated with a subscription administration client and a subscription viewing client) and a priority notification device 22 (e.g., a wireless device used to receive important information). Note that the information controller 700 may communicate with the user devices 21, 22 via the communication network 30 or another communication network. Also note that the subscription/publication device 21 and the priority notification device 22 may be a single device or separate devices associated with a single user. Moreover, the information controller 700 may communicate with user devices 21, 22 associated with a plurality of users.

In one embodiment, a user provides subscription information via the subscription/publication device 21 by accessing a remote, Web-based information controller 700 (e.g., a server) via the Internet. Although preferred embodiments are described with respect to information exchanged via a Web site, according to other potential embodiments information is instead exchanged via a telephone, an Interactive Voice Response Unit (IVRU), electronic mail, a WEBTV® interface, a cable network interface, and/or a wireless communication system.

The user devices 21, 22 and the information controller 700 may be any devices capable of performing the various functions described herein. A subscription/publication device 21 may be, for example: a PC, a portable computing device such as a PDA adapted to provide a Graphical User Interface (GUI), a Wireless Application Protocol (WAP) enabled telephone, or a kiosk (e.g., an information service kiosk located at a hospital), an interactive television device, or any other appropriate storage and/or communication device. The priority notification device 22 can also be any of these devices, or even a pager or facsimile machine.

According to one embodiment, the user devices 21, 22 are associated with a browser-based thin client, such as a JavaScript aware Web browser (and thus may not be restricted with respect to operating systems). According to one embodiment, the information controller 700 is associated with the SUN SOLARIS® 2.6, WINDOWS® NT4, WINDOWS® 2000, or LINUX operating system.

Note that the devices shown in FIG. 3 need not be in constant communication. For example, a priority notification device 22 may only communicate with the information controller 700 via the Internet when appropriate (e.g., when attached to a "docking" station or "cradle" coupled to a user's PC).

According to some embodiments, a user provides subscription information to the information controller 700 via the subscription/publication device 21. For example, a desktop workstation may be used to provide subscription information to the information controller 700. As will be explained with respect to FIG. 4, the information controller 700 may receive such subscription information via a dynamically loadable subscription component.

The subscription information provided by the user may include, for example, a user identifier (e.g., a user name and/or password), a user device identifier, and/or a communication address (e.g., a telephone number or electronic mail address) associated with the user. The information controller 700 may store this information, for example, to facilitate maintenance of customized rules (defined by the user) and/or to communicate with the user.

The subscription information may also include an information identifier and/or an information source identifier. For example, a salesperson may indicate that he or she needs to know when production problems will cause a product's delivery to be delayed.

According to one embodiment, the subscription information also includes an aggregation rule identifier, an aggregation rule, and/or an adjustment to an aggregation rule. For example, a user may select an aggregation rule from a list of potential aggregation rules that were previously defined by an operator associated with the information controller 700. According to other embodiments, the user may modify an existing aggregation rule or even define a new aggregation rule.

According to some embodiments, the subscription information provided by the user also includes an indication of priority and/or notification preference information. For example, the user may define a first rule indicating that he or she wants to have a list of delivery dates published on a Web site that he or she can access. The user may also define a second rule indicating that when a delivery date exceeds a target date by a user-defined threshold amount (e.g., three days), he or she needs to be immediately notified via a wireless pager.

Based on the received subscription information, the information controller 700 collects one or more items of information. For example, the information controller 700 may collect items of information from one or more information sources 12, 14. As will be explained with respect to FIG. 4, the information controller 700 may collect these items of information via a dynamically loadable collection component. The information sources 12, 14 may comprise, for example, an Internet portal, a business application, an Enterprise Resource Planning (ERP) application, and/or a Customer Relationship Management (CRM) application.

The information controller 700 then evaluates the collected information. As will be explained with respect to FIG. 4, the information controller 700 may perform this evaluation via a dynamically loadable aggregation rule (e.g., a rule previously selected or defined by the user). By way of example, the information controller 700 may compare a first item of information collected from the first information source 12 with a second item of information collected from the second information source 14.

Based on the evaluation, the information controller 700 may arrange for the user to receive notification information. For example, the information controller 700 may transmit the notification information to one or more of the user devices 21, 22 associated with the user. According to one embodiment, different user devices 21, 22 are associated with different device types, and the notification information is formatted in accordance with the appropriate device type (e.g., information may be re-formatted as required by a wireless telephone interface). As will be explained with respect to FIG. 4, the information controller 700 may arrange for the user to receive information via a dynamically loadable notification component.

According to one embodiment, some information is received by the user via the subscription/publication device 21 while other information is received via the priority notification device 22. For example, the user may access less important information via the subscription/publication device 21 (e.g., through a browser application running on a desktop PC in accordance with a first user-defined rule) while more important information is immediately received via the priority notification device (e.g., via a wireless PDA in accordance with a second user-defined rule). In either case, information may be transmitted via, for example, a Java Message Service (JMS) compliant system, an electronic mail system, an Instant Messaging (IM) system, the Internet, a Bluetooth network, and/or a telephone network.

The notification information transmitted from the information controller 700 to the user device 21, 22 may comprise, for example, text information (e.g., an electronic mail message), audio information (e.g., generated by a text-to-speech application), image information (e.g., a chart, a photograph, or a video clip), and/or executable information (e.g., a Java applet).

According to one potential embodiment, the information controller 700 also arranges to receive a payment in exchange for facilitating the distribution of information. For example, the information controller 700 may arrange for the user to provide payment of a pre-determined monetary amount (e.g., one dollar per priority notification), a variable monetary amount (e.g., based on the quality of information provided to the user), a subscription amount, and/or a non-monetary amount (e.g., by having the user receive advertisements).

Figure 4:
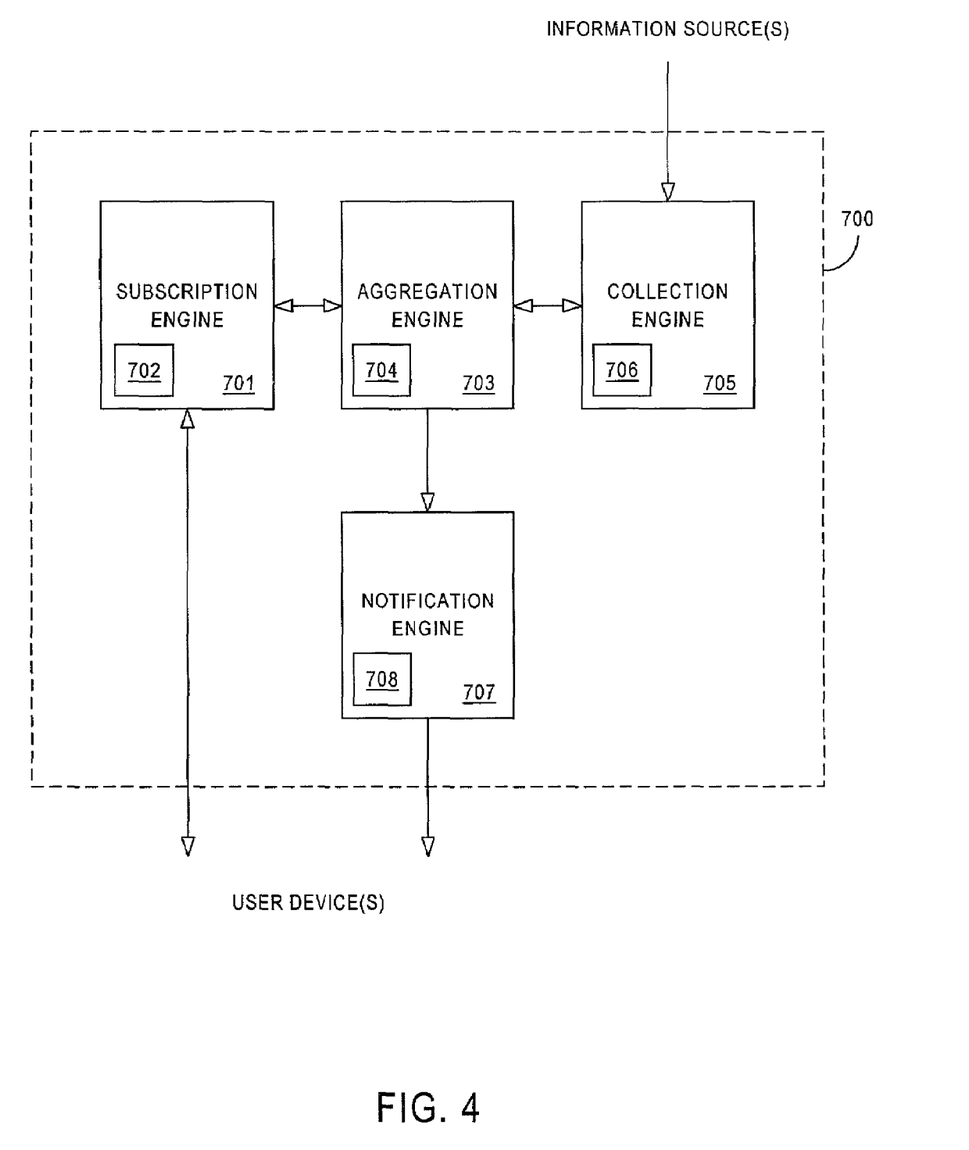
FIG. 4 is an engine-level overview of an information controller according to one embodiment of the present invention.

FIG. 4 is an engine-level overview of the information controller 700 according to one embodiment of the present invention. As can be seen, the information controller 700 includes four server-side engines: a subscription engine 701 (executing one or more dynamically loadable subscription components 702), an aggregation engine 703 (executing one or more dynamically loadable aggregation rules or components 704), a collection engine 705 (executing one or more dynamically loadable collection components 706), and a notification engine 707 (executing one or more dynamically loadable notification components 708).

Note that the details of how to perform the subscription, collection, aggregation, and notification functions described may depend on one or more external systems (e.g., user devices and/or information sources). Therefore, some embodiments of the present invention use the dynamically loadable components 702, 704, 706, 708, such as pluggable Java components, to perform some or all of these functions. The appropriate engine 701, 703, 705, 707 can then dynamically load and unload the components 702, 704, 706, 708 as appropriate.

The information controller 700 may associated with, for example, a Java 2™ Enterprise Edition (J2EE) application server, such as a BEA WEBLOGIC® server acting as an Enterprise JavaBean (EJB) container, and one or more JavaServer Pages (JSP) engines. Moreover, the various applications described herein may be composed of, for example, enterprise JavaBeans. In addition, a Java Message Service (JMS) compliant programming interface and/or a publish-subscribe (e.g., topic based) message model can be used in connection with the information controller 700 architecture.

For example, the dynamically loadable components 702, 704, 706, 708 may: (i) provide one or more templates as a basis to create an aggregation rule; (ii) know what information is needed to execute an aggregation rule; (iii) know how the aggregation rule will execute on that information; (iv) know which information sources are involved; (v) know how to connect with those information sources to collect the information; and/or (vi) know how to present the resulting information via one or more user devices. According to one embodiment, a systems administrator may create a dynamically loadable component 702, 704, 706, 708 using a simple, well-defined Application Program Interface (API).

In particular, the subscription engine 701 and associated subscription component 702 provide an interface between the information controller 700 and a user (e.g., via one or more user devices). A graphical user interface may provide users with a way to create and/or administer rules for gathering and processing information. According to one embodiment, the subscription engine 701 also returns information to the user (e.g., less important information).

The aggregation engine 703 and associated aggregation component 704 may analyze collected information and create results to be provided to a user. For example, the aggregation engine 703 may receive a message from the subscription engine 701 when a user creates a new rule. The aggregation engine 703 may then create the structures needed to perform the analysis based on the user's requirements. The aggregation engine 703 also receives collected data from the collection engine 705 and executes the appropriate rules using the collected information. For example, the collected information may be transformed from an input structure to an output structure in accordance with an aggregation rule. This analysis and the resulting transformation may comprise a wide variety of activities, including joining information from many input structures and transforming data in individual fields based on pre-defined rules and/or the content of other fields.

The collection engine 705 and associated collection component 706 gather the raw information from external information sources. According to one embodiment, this information is extracted from a source dataset. The source dataset is typically owned by another application and is used in a read/write fashion by that application (e.g., an operational system, a data mart, or Internet portal).

The collection engine 705 may, for example, receive a message from the aggregation engine 703 when a new rule is created and prepare a specialized collection rule to gather the required data. These collection rules may be as simple as "include all data" or may be associated with a more complex process that involves the extraction of certain fields from certain records under varying conditions. The collection engine 705 may then deliver the collected data to the aggregation engine 703.

The notification engine 707 and associated notification component 708 present important information to a user (e.g., via a wireless user device). For example, a user might indicate that important information must be transmitted to a wireless telephone in addition to his or her PC workstation. Note that this may require that some information be re-formatted to suit these devices. The notification engine 707 may handle this re-formatting and the transmission of information to the user device.

According to one embodiment, the information created by the information controller 700 also serves as an input to an external application. For example, a certain condition may require the automatic generation of a help desk ticket. In such a case, the notification engine 707 may simply treat the external application as another device that needs to receive information (and use the external application's defined interfaces to format the information as appropriate).

Because the various devices associated with the information system 300 (e.g., the user devices and the information sources) may require different information structures (e.g., associated with internal and external systems), communications may be flexibly handled via an Extendable Markup Language (XML) data format. Moreover, information exchange between the engines 701, 703, 705, 707 in the information controller 700 may also be handled via an XML data format.

EXAMPLE

Figure 5:
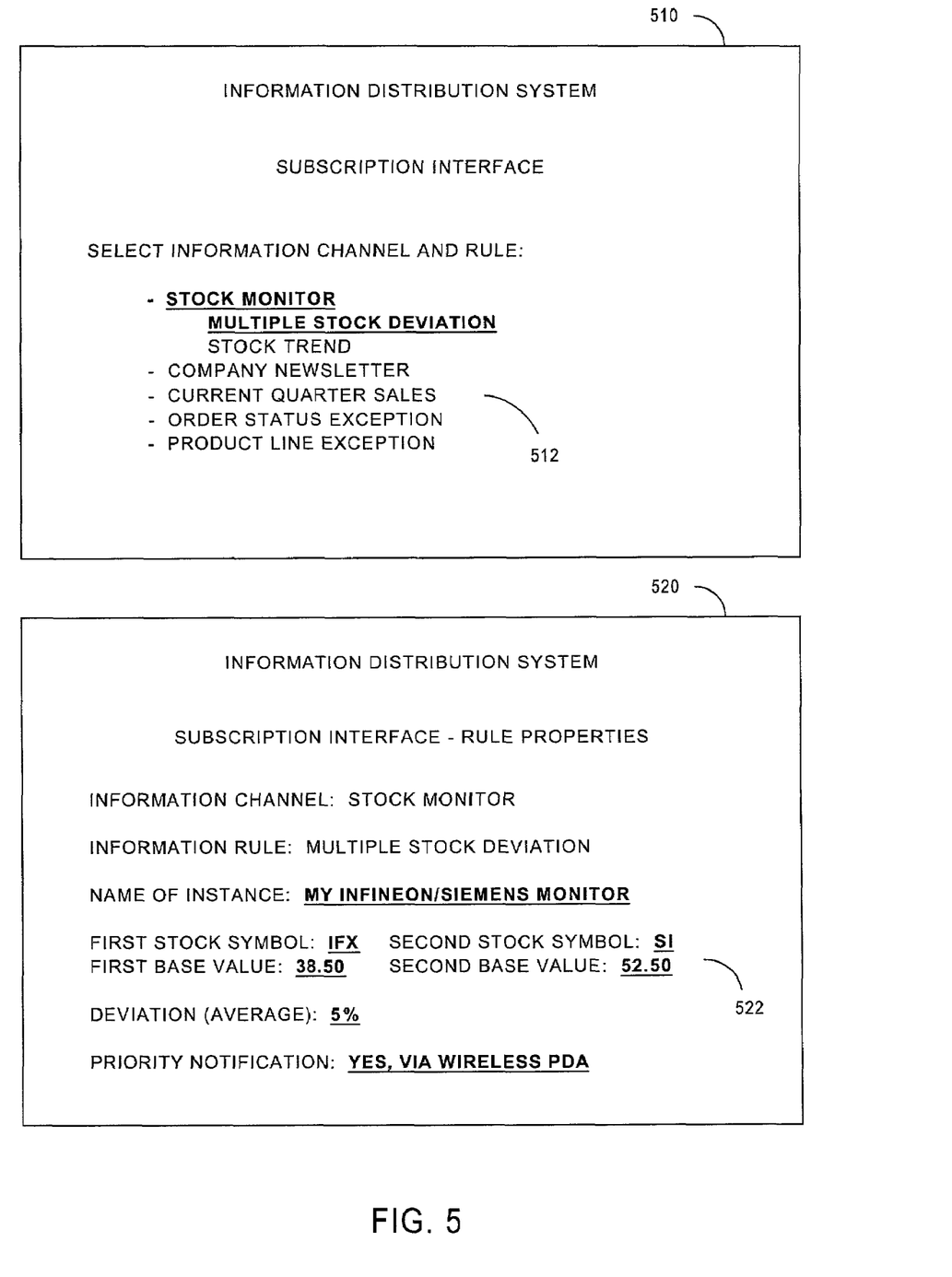
FIG. 5 illustrates user subscription displays according to an embodiment of the present invention.

By way of example, FIG. 5 illustrates user subscription displays 510, 520 according to an embodiment of the present invention. In particular, the first user subscription display 510 includes a list 512 of information types or channels (e.g., "stock monitor" or "current quarter sales") and associated information rules (e.g., "multiple stock deviation" or "stock trend"). Note that the user may have previously entered a user name and password via a login display (not shown in FIG. 5). As indicated by the bold, underlined text in the first user subscription display 510, the user has selected the "multiple stock deviation" information rule associated with the "stock monitor" information channel from the list 512.

Figure 6:
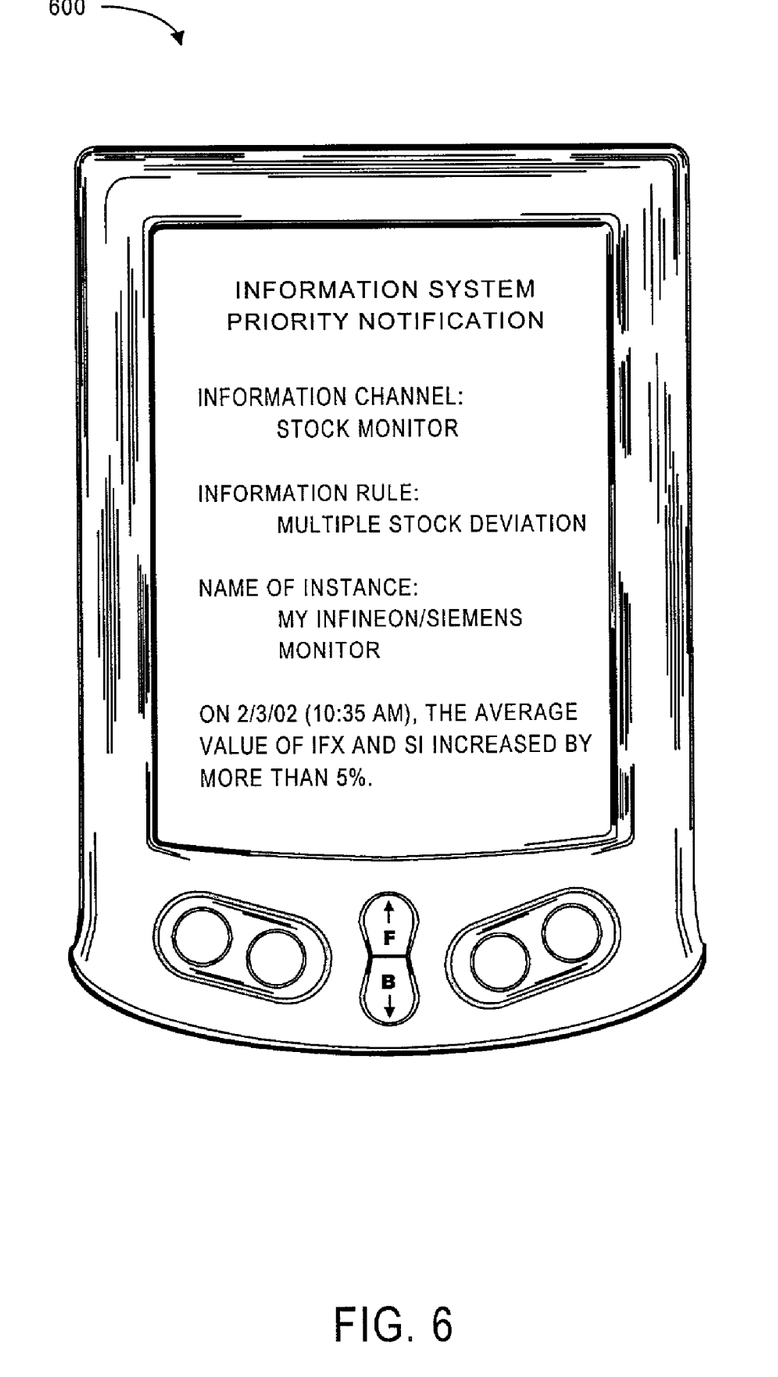
FIG. 6 illustrates a user device displaying priority notification information according to an embodiment of the present invention.

After the user selects the information channel and information rule, he or she is presented with the second user subscription display 520. This display 520 includes an area 522 where the user can provide further information or parameters (as indicated by the bold, underlined text). In this example, the user has indicated that he or she wants to receive a priority notification via a wireless PDA when the values of two stocks (i.e., "IFX" and "SI") deviate (on average) from base values (i.e., "38.50" and "52.50," respectively) by more than five percent. FIG. 6 illustrates a user device 600 (i.e., a PDA) displaying priority notification information according to an embodiment of the present invention.

In this way, the information system 300 can act as an event-oriented mediator—and as a flexible business intelligence system that aggregates content (including enterprise and non-enterprise content) in substantially real time to enable quick response by users. Note, however, that the various processes performed herein in "substantially real time" may actually be performed on a periodic basis (e.g., once every hour).

Information Controller

Figure 7:
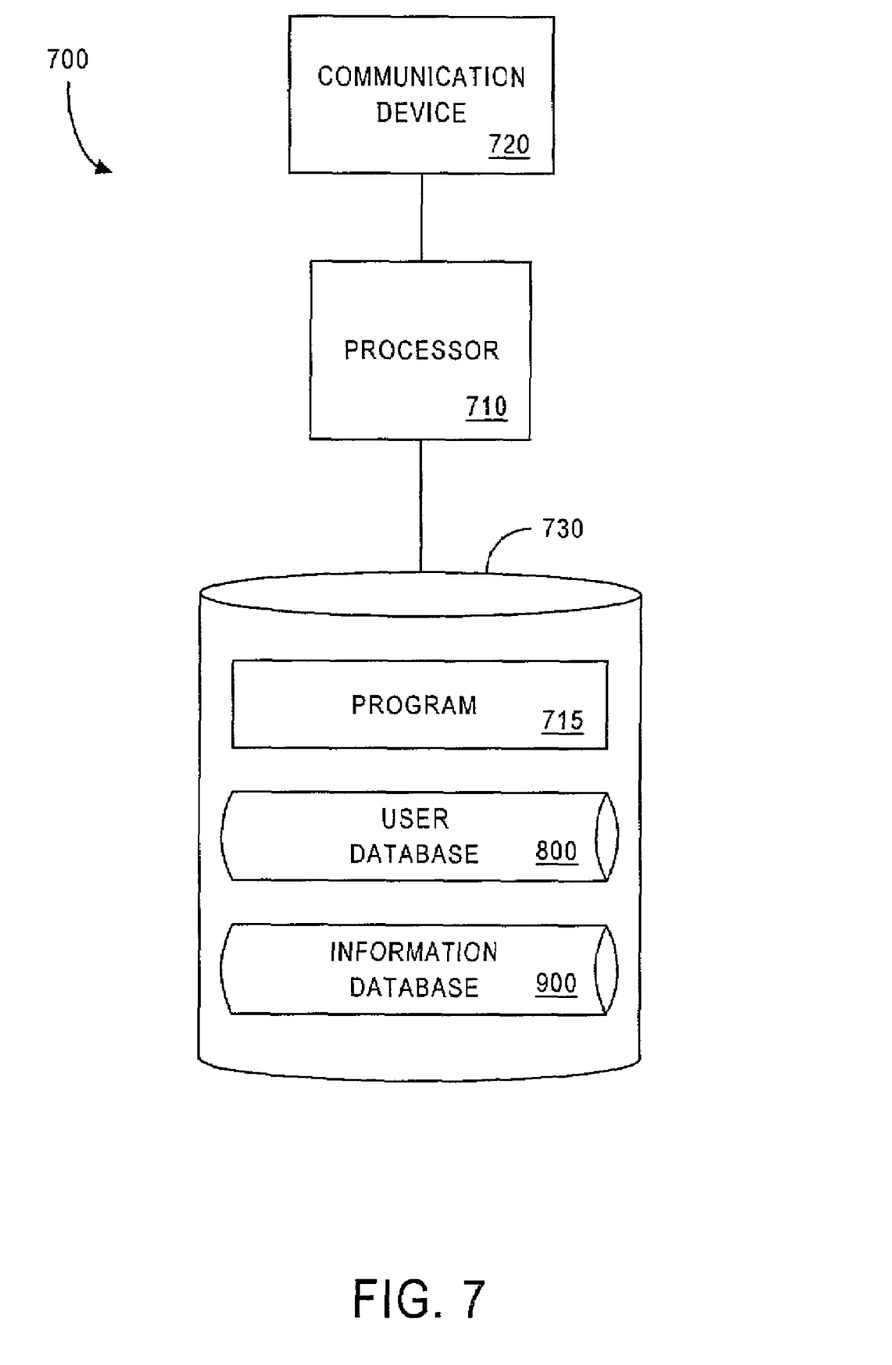
FIG. 7 is a block diagram of an information controller according to an embodiment of the present invention.

FIG. 7 illustrates an information controller 700 according to one embodiment of the present invention. The information controller 700 comprises a processor 710, such as one or more INTEL® Pentium® processors, coupled to a communication device 720 configured to communicate via a communication network (not shown in FIG. 7). The communication device 720 may be used to communicate, for example, with user devices and information sources.

The processor 710 is also in communication with a storage device 730. The storage device 730 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 730 stores a program 715 for controlling the processor 710. The processor 710 performs instructions of the program 715, and thereby operates in accordance with the present invention. For example, the processor 710 may collect an item of information. The processor 710 may then evaluate the item of information via a dynamically loadable aggregation rule associated with a user, and arrange for the user to receive notification information based on the evaluation.

According to another embodiment, the processor 710 receives subscription information defining an aggregation rule from a user. The processor 710 then collects a first item of information from a first information source and a second item of information from a second information source. The first and second items of information are dynamically evaluated via the aggregation rule, and the processor 710 (i) stores publication information to be later provided via first user device and (ii) transmits priority information to a second user device.

According to still another embodiment, the processor 710 receives first and second items of information, and evaluates the information via an aggregation rule associated with a user. The processor 710 then arranges for the user to receive notification information based on the evaluation.

According to yet another embodiment, the processor 710 receives subscription information from a user, the subscription information indicating a first user device, a second user device, and defining an aggregation rule. The processor 710 collects an item of information from an information source, and evaluates the item of information via the aggregation rule defined by the user. Based on this evaluation, the processor 710 arranges for the user to receive notification information at least one of the user devices.

As used herein, information may be "received" by or "transmitted" to, for example: (i) the information controller 700 from an information source 10 or a user device 20; or (ii) a software application or module within the information controller 700 from another software application, module, or any other source.

Figure 8:
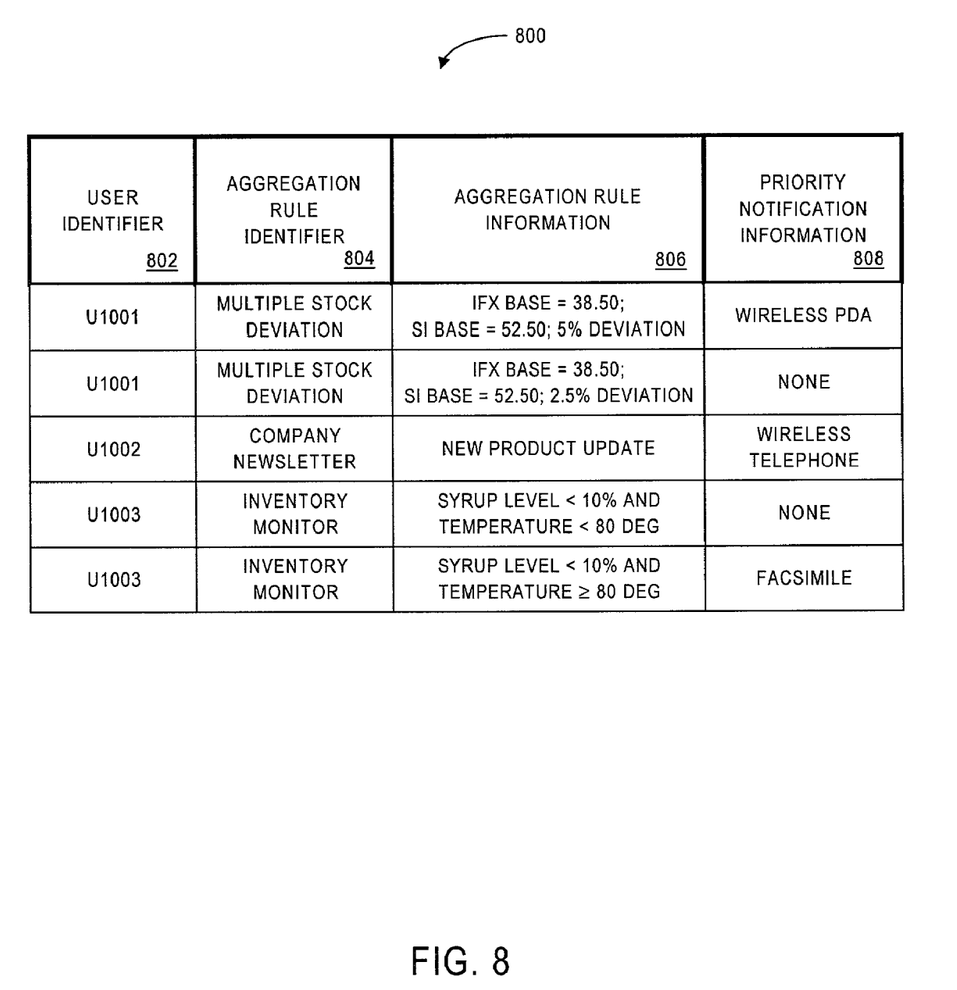
FIG. 8 is a tabular representation of a portion of a user database according to an embodiment of the present invention.
Figure 9:
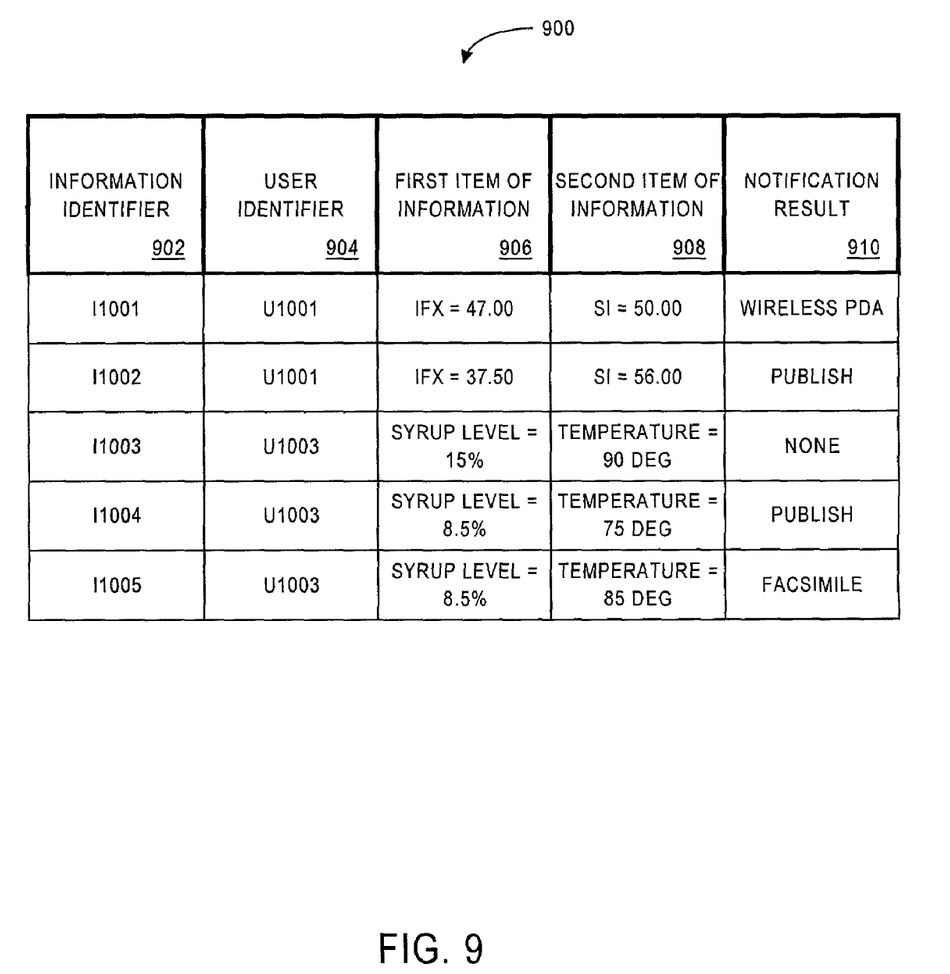
FIG. 9 is a tabular representation of a portion of an information database according to an embodiment of the present invention.

As shown in FIG. 7, the storage device 730 also stores a user database 800 (described with respect to FIG. 8) and an information database 900 (described with respect to FIG. 9). Examples of databases that may be used in connection with the information controller 700 will now be described. Note that the illustrations and accompanying descriptions of the databases presented herein are exemplary, and any number of other database arrangements could be employed besides those suggested by the figures.

User Database

Referring to FIG. 8, a table represents the user database 800 that may be stored at the information controller 700 according to an embodiment of the present invention. The table includes entries identifying users who have subscribed to receive information via the information system 300. The table also defines fields 802, 804, 806, 808 for each of the entries. The fields specify: a user identifier 802, an aggregation rule identifier 804, aggregation rule information 806, and priority notification information 808. The information in the user database 800 may be created and updated, for example, based on information received from a user when he or she provides subscription information to the information controller 700.

The user identifier 802 may be, for example, an alphanumeric code associated with a user who has subscribed to receive information via the information system 300. The user identifier 802 may be generated by, for example, the information controller 700 or the user (e.g., when he or she provides a user name and password).

The aggregation rule identifier 804 and aggregation rule information 806 define a rule that will be used by the information controller 700 to collect information and to determine when information will be transmitted to the user associated with the user identifier 802. For example, the aggregation rule identifier 804 may indicate a rule template and the aggregation rule information 806 may indicate one or more parameters provided by the user.

In particular, the first entry in the user database 800 is associated with the example described herein with respect to FIGS. 5 and 6. The fourth and fifth entries in the user database 800 indicate that a user having a user identifier 802 of "U1003" wants to receive inventory monitor information when (i) the syrup level is less than ten percent and the temperature is less than eighty degrees or when (ii) the syrup level is less than ten percent and the temperature is at least eighty degrees.

According to one embodiment, when any of the rules defined in the user database 800 are satisfied, publication information is generated that may be retrieved by the user (e.g., when he or she access a Web site). The priority notification information 808 indicates if a user also needs to receive an immediate indication that a rule has been satisfied (e.g., via a wireless telephone).

For example, as illustrated by the fourth and fifth entries in the user database 800, the user will receive publication information whenever the syrup level is less than ten percent (i.e., regardless of the temperature). However, if the syrup level is less than ten percent and the temperature is also at least eighty degrees, the user will also receive a priority notification via a facsimile machine.

Information Database

Referring to FIG. 9, a table represents the information database 900 that may be stored at the information controller 700 according to an embodiment of the present invention. The table includes entries identifying information that has been collected and analyzed by the information controller 700. The table also defines fields 902, 904, 906, 908, 910 for each of the entries. The fields specify: an information identifier 902, a user identifier 904, a first item of information 906, a second item of information 908, and a notification result 910. The information in the information database 900 may be created and updated, for example, based on information received from one or more information sources.

The information identifier may be, for example, an alphanumeric code associated with information that has been collected by the information controller 700 (e.g., in accordance with a user-defined rule). The user identifier 802 may be, for example, an alphanumeric code associated with a user and may be based on, or associated with, the user identifier 802 stored in the user database 800.

The first item of information 906 and the second item of information 908 represent values that have been collected by the information controller 700 (e.g., based on the aggregation rule identifier 804 stored in the user database 800). With respect to the first two entries in the information database 900, these values represent current stock values. With respect to the third through the fifth entries, the first item of information 906 represents a current syrup level while the second item of information 908 represents a current temperature.

The notification result 910 may be generated by the information controller based on, for example, an aggregation rule template and the aggregation rule information 806 stored in the user database 800. For example, as illustrated by the first entry in the information database 900, the notification result 910 indicates that a priority notification will be transmitted to the user's wireless PDA because the stock's current value has deviated from the base values (on average) by more than five percent. The fourth entry in the information database illustrates that information will be published to the user (e.g., via a subscription/publication device 21) without being transmitted to a facsimile machine (e.g., the priority notification device 22) because the current temperate is less than eighty degrees.

Information System Components

Figure 10:
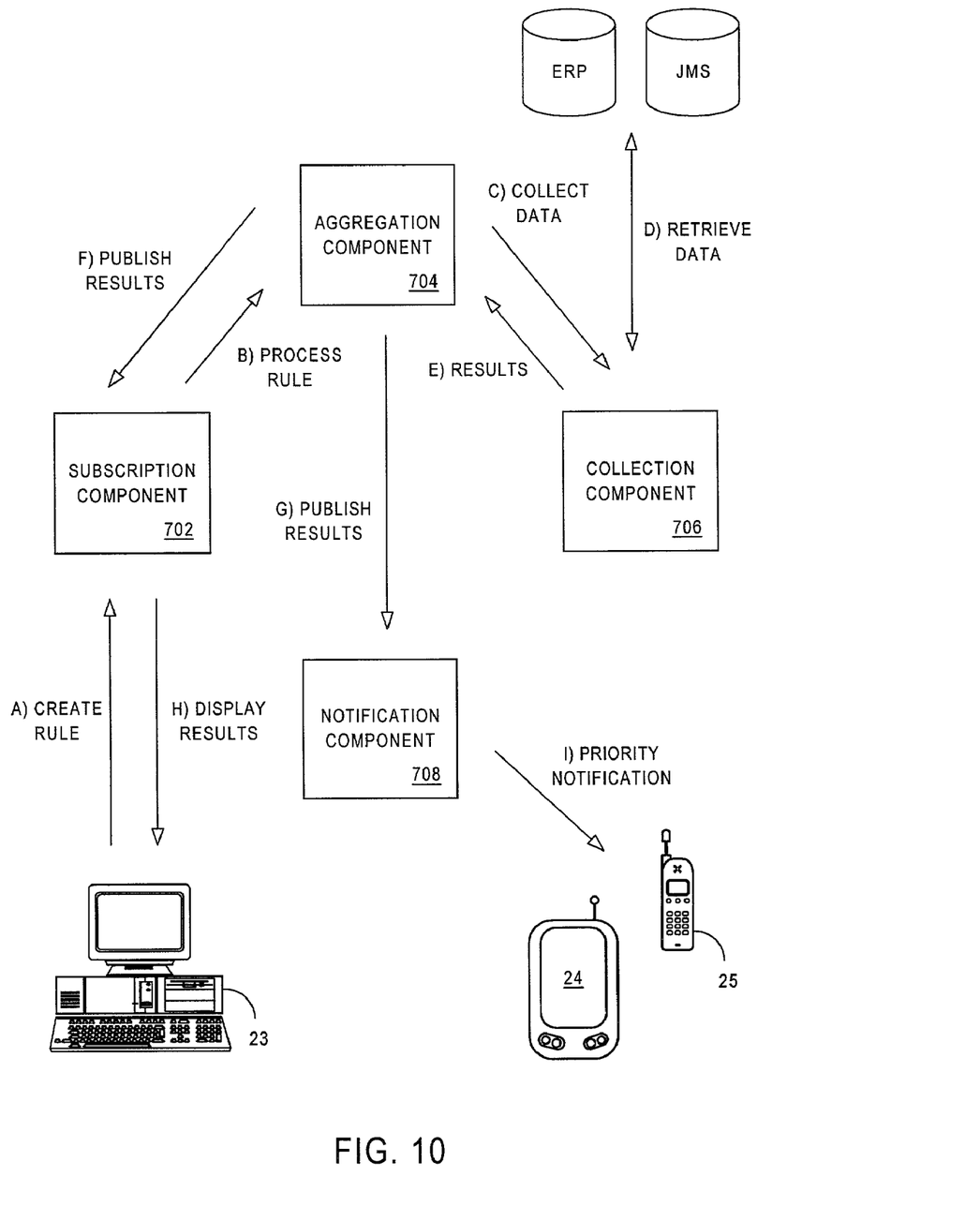
FIG. 10 is a component-level overview of an information system according to one embodiment of the present invention.

FIG. 10 is a component-level overview of an information system according to one embodiment of the present invention. At (A), the subscription component 702 receives from a user's PC 23 information that will define or create an aggregation rule.

Based on the information received from the user's PC 23, the subscription component 702 transmits information to the aggregation component 704 in order to process the rule at (B). The aggregation component 704 then transmits information to the collection component 706 in order to collect the appropriate data at (C).

Based on the information received from the aggregation component 704, the collection component 706 connects to, and receives information from, one or more information at sources at (D)—such as an ERP database and/or a JMS database. The collection component 706 returns the collected information (e.g., the results of the collection process) to the aggregation component 704 at (E).

The aggregation component 704 then evaluates the information received from the collection component 706. If the collected information satisfies the rule defined by the user, the aggregation component 704 transmits information to the subscription component 702 at (F) to publish the results. The aggregation component may also transmit information to the notification component 708 at (G).

The subscription component 702 then arranges for the appropriate results to be displayed to the user via the user's PC 23 at (H). The notification component 708 may also arrange for a priority notification to be transmitted (e.g., after the results have been re-formatted as appropriate) to a user's PDA 24 and/or wireless telephone 25 at (I).

In this way, the information system 300 may process information from information sources in user-specific ways to create insights that drive strategic business decisions and/or support operational processes with new functions. The information created by the information system 300 may be, for example, conclusive, fact based, and actionable. Moreover, the user may perceive an interaction with the information directly (as opposed to an interaction with the information system 300). The user does not need to manually search for the information, and yet he or she has significant freedom and flexibility in defining the rules that will be used to collect and aggregate the appropriate information (an results may be automatically processed to in accordance with the requirements of one or more user devices).

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although many embodiments have been described with respect to information collected or reported via the Internet, the present invention is applicable to any communication network. For example, a user may receive a priority notification via his or her wired telephone.

Moreover, although the embodiments described herein depict information being routed from an information source 10 to a user device 20 via an information controller 700, according to another embodiment the information controller 700 instead arranges for an information source 10 to transmit information directly to a user device 20 when appropriate.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of facilitating a distribution of information, comprising:
    collecting an item of information;
    evaluating the item of information via a dynamically loadable aggregation rule associated with a user;
    arranging for the user to receive notification information based on said evaluation; and
    receiving subscription information from the user, wherein the subscription information comprises at least one of: (i) an indication of priority, and (ii) notification preference information.

2. The method of claim 1, wherein said collecting is performed via a dynamically loadable collection component.

3. The method of claim 1, wherein said receiving subscription information is performed via a dynamically loadable subscription component.

4. The method of claim 1, wherein the subscription information comprises at least one of: (i) a user identifier, (ii) a user device identifier, and (iii) a communication address associated with the user.

5. The method of claim 1, wherein the subscription information comprises at least one of: (i) an information identifier, and (ii) an information source identifier.

6. The method of claim 1, wherein the item of information is collected via at least one of: (i) an Internet portal, (ii) a business application, (iii) an enterprise resource planning application, and (iv) a customer relationship management application.

7. The method of claim 1, wherein said arranging is performed via a dynamically loadable notification component.

8. The method of claim 1, wherein said arranging comprises transmitting the notification information to a user device associated with the user.

9. A method of facilitating a distribution of information comprising:
    collecting an item of information;
    evaluating the item of information via a dynamically loadable aggregation rule associated with a user;
    arranging for the user to receive notification information based on said evaluation; and
    receiving subscription information from the user, wherein the subscription information comprises at least one of: (i) an aggregation rule identifier, (ii) an aggregation rule, and (iii) an adjustment to an aggregation rule.

10. The method of claim 9, wherein said collecting is performed via a dynamically loadable collection component.

11. The method of claim 9, wherein said receiving subscription information is performed via a dynamically loadable subscription component.

12. The method of claim 9, wherein the subscription information comprises at least one of: (i) a user identifier, (ii) a user device identifier, and (iii) a communication address associated with the user.

13. The method of claim 9, wherein the subscription information comprises at least one of: (i) an information identifier, and (ii) an information source identifier.

14. The method of claim 9, wherein the item of information is collected via at least one of: (i) an Internet portal, (ii) a business application, (iii) an enterprise resource planning application, and (iv) a customer relationship management application.

15. The method of claim 9, wherein said arranging is performed via a dynamically loadable notification component.

16. The method of claim 9, wherein said arranging comprises transmitting the notification information to a user device associated with the user.

17. The method of claim 16, wherein the user device is associated with a device type, and the notification information is formatted in accordance with the device type.

18. The method of claim 16, wherein said arranging comprises: (i) transmitting publication information to a first user device and (ii) transmitting priority information to a second user device.

19. The method of claim 16, wherein said transmitting is associated with at least one of: (i) a Java message service compliant system, (ii) an electronic mail system, (iii) an instant messaging system, (iv) the internet, (v) a Bluetooth network, and (vi) a telephone network.

20. The method of claim 16, wherein said transmitting is associated with at least one of: (i) a personal computer, (ii) a portable computing device, (iii) a portable digital assistant, (iv) a telephone, (v) a wireless telephone, (vi) a pager, and (vii) a kiosk.

21. The method of claim 16, wherein the notification information comprises at least one of: (i) text information, (ii) audio information, (iii) image information, and (iv) executable information.

22. The method of claim 9, wherein said collecting, evaluating, and arranging are automatically performed in substantially real time.

23. The method of claim 9, further comprising:
arranging for the user to provide payment of at feast one of: (i) a pre-determined monetary amount, (ii) a variable monetary amount, (iii) a subscription amount, and (iv) a non-monetary amount.

24. A computer-implemented method of facilitating a distribution of information, comprising:
receiving subscription information from a user, the subscription information defining an aggregation rule;
collecting a first item of information from a first information source;
collecting a second item of information from a second information source; dynamically evaluating the first item of information and the second item of information based on the aggregation rule;
transmitting publication information to a first user device based on said evaluation; and
transmitting priority information in substantially real time to a second user device based on said evaluation.

25. An apparatus for facilitating a distribution of information, comprising:
a processor; and
a storage device in communication with said processor and storing instructions adapted to be executed by said processor to:
collect an item of information,
evaluate the item of information via a dynamically loadable aggregation rule associated with a user,
arrange for the user to receive notification information based on said evaluation; and
receiving subscription information from the user, wherein the subscription information comprises at least one of: (i) an indication of priority, and (ii) notification preference information.

26. The apparatus of claim 25, wherein said storage device further stores at least one of: (i) a user database, and (ii) an information database.

27. The apparatus of claim 25, further comprising:
a communication device coupled to said processor and adapted to communicate with at least one of: (i) an information controller, (ii) an information source, (iii) a user device (iv) a subscription device, (v) a publication device, and (vi) a priority notification device.

28. A medium storing instructions adapted to be executed by a processor to perform a method of facilitating a distribution of information, said method comprising:
collecting an item of information;
evaluating the item of information vie a dynamically loadable aggregation rule associated with a user;
arranging for the user to receive notification information based on said evaluation; and
receiving subscription information from the user, wherein the subscription information comprises at least one of: (i) an indication of priority, and (ii) notification preference information.

29. A method of facilitating a distribution of information, comprising:
receiving subscription information from a user, the subscription information indicating a first user device, a second user device, and defining an aggregation rule;
collecting an item of information from an information source;
evaluating the item of information based on the aggregation rule defined by the user; and
arranging for the user to receive notification information via at least one of the first user device and the second user device based on said evaluation.

30. A method performed by a user, comprising:
providing subscription information to an information controller, the subscription information defining an aggregation rule indicating publication information to be received via a first user device and priority information to be received via a second user device; and
receiving information via at least one of the first user device and the second user device based on the aggregation rule.

31. An apparatus for facilitating a distribution of information, comprising:
a processor; and
a storage device in communication with said processor and storing instructions adapted to be executed by said processor to:
collect an item of information,
evaluate the item of information via a dynamically loadable aggregation rule associated with a user,
arrange for the user to receive notification information based on said evaluation; and
receiving subscription information from the user, wherein the subscription information comprises at least one of: (i) an aggregation rule identifier, (ii) an aggregation rule, and (iii) an adjustment to an aggregation rule.

32. A medium storing instructions adapted to be executed by a processor to perform a method of facilitating a distribution of information, said method comprising:
collecting an item of information;
evaluating the item of information via a dynamically loadable aggregation rule associated with a user;
arranging for the user to receive notification information based on said evaluation; and
receiving subscription information from the user, wherein the subscription information comprises at least one of (i) an aggregation rule identifier, (ii) an aggregation rule, and (iii) an adjustment to an aggregation rule.

* * * * *

UNITED STATES PATENT AND TRADEMARK OFFICE
CERTIFICATE OF CORRECTION

| | | |
|---|---|---|
| PATENT NO. | : 6,976,086 B2 | Page 1 of 1 |
| APPLICATION NO. | : 09/908010 | |
| DATED | : December 13, 2005 | |
| INVENTOR(S) | : Amir Sadeghi et al. | |

It is certified that error appears in the above-identified patent and that said Letters Patent is hereby corrected as shown below:

Title Page # 75 of the inventors listing of the patent "Rakowski" should be changed to --Rakousky--

Signed and Sealed this

Ninth Day of January, 2007

JON W. DUDAS
*Director of the United States Patent and Trademark Office*